UNITED STATES PATENT OFFICE.

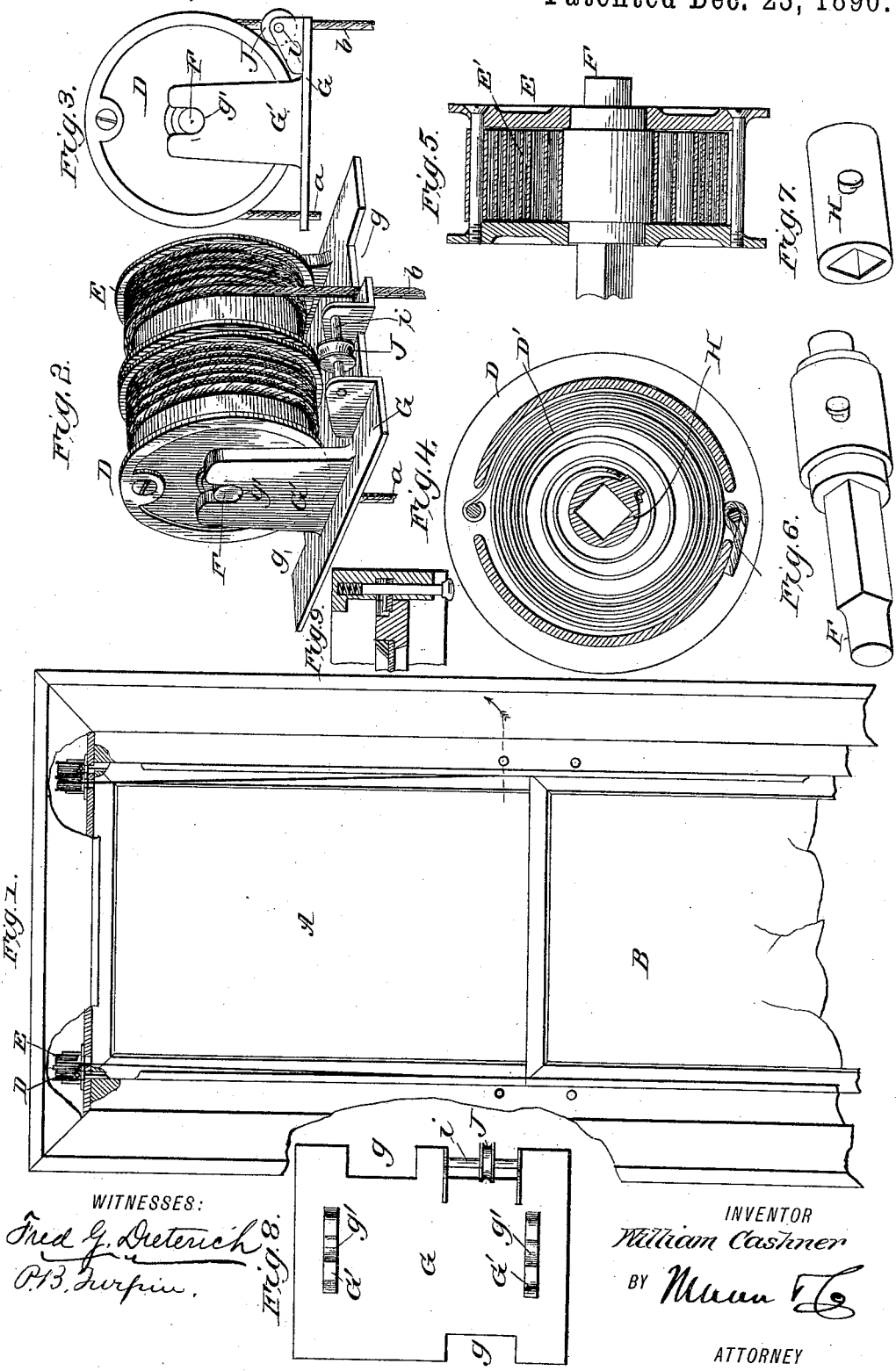

WILLIAM CASHNER, OF PLEASANT HILL, MISSOURI.

SASH-BALANCE.

SPECIFICATION forming part of Letters Patent No. 443,391, dated December 23, 1890.

Application filed June 16, 1890. Serial No. 355,598. (No model.)

*To all whom it may concern:*

Be it known that I, WILLIAM CASHNER, of Pleasant Hill, in the county of Cass and State of Missouri, have invented a new and useful Improvement in Sash-Balances, of which the following is a specification.

My invention is an improvement in sash-balances; and it consists in certain novel constructions and combinations of parts, as will be hereinafter described and claimed.

In the drawings, Figure 1 is a face view of a window provided with my improvements. Fig. 2 is a perspective detail view of the improvements. Fig. 3 is a side view of same. Figs. 4 and 5 are sectional views of the pulleys. Fig. 6 is a detail view of the axle or shaft. Fig. 7 is a detail view of the hub. Fig. 8 is a detail view of the bracket, and Fig. 9 a detail view of the lock or latch.

In carrying out the invention the upper and lower sashes A B are supported by suspension-cords $a$ $b$, which extend up and are secured to pulleys D and E, the said cords $a$ and $b$ being wound, respectively, on the pulleys D and E and in reverse directions. The said pulleys D and E are supported on shaft F, which is suitably journaled, preferably in bearings provided at $g'$ in uprights G', mounted on a base piece or plate G, such construction forming a bearing frame or bracket.

The pulleys D and E are of the same size. One of these pulleys—in the construction shown the pulley E—is journaled directly on the shaft F, while the other pulley is journaled on a hub or sleeve H, which latter is held from turning on the shaft by forming it with a non-circular opening fitting a non-circular portion of the shaft and slipped onto same from one end. The pulleys D and E are actuated by springs D' and E', contained in them. The spring D' is secured at its inner end to the hub or sleeve H and at its outer end to the pulley D.

The spring E' is secured at its inner end to the shaft F and at its outer end to the pulley, such springs D' E' being preferably secured at their said outer ends to the pulleys by means of one of the screws securing the sections of the pulleys together, the other screw serving to secure the rope to the pulley, as shown. By means of the separate springs to each pulley I am able to secure a stronger operation of the sashes, and the turning of one pulley as its sash is lowered operates in a measure to tighten the spring in the other pulley, and so increase its tension. The journaling of one pulley on the hub or sleeve and fitting the latter on the shaft or spindle enables the convenient placing of the pulleys together. I suit the tension of the springs to the weight of the sash by one or more extra wraps of the cord on the pulley to increase the spring-power before attaching the second cord to the sash.

In use the brackets or frames may be placed and secured on top or head of the window-frame, the cords dropping through openings therein to properly connect with the sashes, as will be understood from the drawings, or in buildings already erected, in which the head-casings cannot be conveniently removed, by cutting through the head and properly supporting the bracket or frame. To permit the cords to drop from the opposite sides of the pulleys, I form the base-plate G with openings or recesses $g$ in its edges.

In order to permit the cords to both drop from the same side of the bracket, the construction shown in Fig. 8 may be preferred. In this construction there is provided at one edge of the base-plate a guide-pulley J, supported on a rod $i$, so such pulley may move in the direction of its axis, so as to follow the motion of the cord from side to side as it winds on and off its pulley. By this construction the bracket may be arranged at the side of the ways for the sash instead of immediately over the sashes.

It will be understood that the plate or bracket might be attached to the side of a window-frame for use in circle, segment, or Gothic windows.

To secure the sashes at any desired height, the lock or latch shown in Fig. 9 may be employed. In this construction, as will be seen from the drawings, the latch is a short rod having at its inner end a handle-knob spring-pressed at its inner end and provided with a pin or projection to enter notches in the sashes.

The shaft or spindle is supported to turn freely in its bearings in either direction. By so supporting the shaft and arranging the springs reversely, as before described, both the springs are called into play by the lowering of either sash, so that both such springs will assist in raising the lowered sash. The two springs being secured on the same shaft and arranged as shown, and such shaft being supported and arranged to turn freely in either direction, the two springs thus become as one spring of a length equal to the combined length of both springs. In lowering one of the sashes to its full extent each spring bears half the strain, avoiding the extreme tension that would result from the use of a single spring. By means of the sleeve H the fitting of the pulleys together upon the spindle is facilitated.

Having thus described my invention, what I claim as new is—

1. An improved sash-balance comprising the support, the shaft or spindle journaled in said support and free to turn in either direction, and the springs arranged in said pulleys and secured at their outer ends to the pulleys and connected at their inner ends to the shaft or spindle, the said springs being wound in reverse directions, all substantially as and for the purposes set forth.

2. In a sash-balance, substantially as described, the combination of the shaft or spindle, the pulley journaled on said shaft, the spring connecting the shaft with the said pulley, a hub or sleeve H, keyed on the shaft or spindle alongside the first pulley, a second pulley journaled on the hub or sleeve H, and the spring connecting the said pulley and sleeve, the springs in the first and second pulleys being reversed, all substantially as and for the purposes set forth.

WILLIAM CASHNER.

Witnesses:
T. A. McArthur,
J. S. Headen.